(12) United States Patent
Kamrath et al.

(10) Patent No.: US 7,148,882 B2
(45) Date of Patent: Dec. 12, 2006

(54) CAPACITOR BASED FORCE SENSOR

(75) Inventors: Robert F. Kamrath, Mahtomedi, MN (US); Michael E. Hamerly, Vadnais Heights, MN (US); Billy L. Weaver, Eagan, MN (US)

(73) Assignee: 3M Innovatie Properties Company, St. Paul, MN (US)

( * ) Notice: Subject to any disclaimer, the term of this patent is extended or adjusted under 35 U.S.C. 154(b) by 348 days.

(21) Appl. No.: 10/439,447

(22) Filed: May 16, 2003

(65) Prior Publication Data

US 2004/0227736 A1 Nov. 18, 2004

(51) Int. Cl.
*G09G 5/00* (2006.01)

(52) U.S. Cl. .................. 345/174; 178/18.01; 178/19.01

(58) Field of Classification Search ................ 345/173, 345/174, 175, 176, 177, 178, 179; 178/18.01–18.07, 178/19.01, 19.02, 19.03, 19.04, 19.05, 19.06
See application file for complete search history.

(56) References Cited

U.S. PATENT DOCUMENTS

| | | | |
|---|---|---|---|
| 4,370,697 A | 1/1983 | Haberl et al. | |
| 4,562,742 A | 1/1986 | Bell | |
| 5,317,919 A | 6/1994 | Awtrey | |
| 5,510,813 A * | 4/1996 | Makinwa et al. | ........... 345/173 |
| 5,563,632 A | 10/1996 | Roberts | |
| 5,680,160 A * | 10/1997 | LaPointe | ..................... 345/173 |
| 5,714,694 A | 2/1998 | Diessner | |
| 6,006,386 A | 12/1999 | Smith | |
| 6,222,528 B1 * | 4/2001 | Gerpheide et al. | .......... 345/173 |
| 6,531,951 B1 | 3/2003 | Serban et al. | |
| 2002/0149571 A1 | 10/2002 | Roberts | |
| 2002/0163509 A1* | 11/2002 | Roberts | ..................... 345/173 |
| 2003/0210235 A1* | 11/2003 | Roberts | ..................... 345/173 |

FOREIGN PATENT DOCUMENTS

| | | |
|---|---|---|
| WO | WO 02/084244 | 10/2002 |
| WO | WO 02/084578 | 10/2002 |
| WO | WO 02084579 | 10/2002 |

* cited by examiner

*Primary Examiner*—Richard Hjerpe
*Assistant Examiner*—Jean Lesperance
(74) *Attorney, Agent, or Firm*—Robert J. Pechman (57) ABSTRACT

The invention provides a novel capacitive device configured to detect differences in an applied force over a continuous range of applied force that includes zero force. The device includes first and second electrodes that are spaced apart a predetermined distance from each other in a rest position. A measurable capacitance exists between the first and second electrodes. Structured elements having a predetermined maximum dimension are positioned in the device to control the predetermined distance between the first and second electrodes. An applied force to the device causes a change in the distance between the first and second electrodes and a related change in the capacitance that can be measured to determine information related to the applied force.

34 Claims, 2 Drawing Sheets

CAPACITOR BASED FORCE SENSOR

FIELD OF THE INVENTION

The present invention relates to force-based touch sensors, and more particularly relates to controlling spacing between electrodes of a force-based touch sensor.

BACKGROUND

The ability to sense and measure the force and/or location of a touch applied to a surface is useful in a variety of contexts. As a result, various systems have been developed in which force sensors are used to measure properties of a force (referred to herein as a "touch force" or an "applied force") applied to a surface (referred to herein as a "touch surface"). Force sensors typically generate signals in response to the applied force that may be used, for example, to locate the position of an applied force on the touch surface.

Determining the location of an applied force to a touch surface is of particular interest when the touch surface is that of a computer display or a transparent overlay in front of a computer display. Furthermore, the need for small, lightweight, and inexpensive devices that are capable of determining touch location is increasing due to the proliferation of mobile and hand-held devices, such as personal digital assistants (PDAs). The touch screens that perform this function may be built with a number of possible technologies. In addition to the force principal just mentioned, capacitive, resistance, acoustic, and infrared techniques are among those that have been used.

The force principal has some potential advantages over competing technologies. Since force techniques may be applied to any overlay material, or indeed to the entire display itself, there is no need to interpose materials or coatings with low durability or poor optical properties. Also, since touch force is the basis for perceiving the touch input, the sensitivity of a force-based device is predictable to the user. With capacitive measurement, for example, touch threshold varies with condition of the user's skin, and with interposing materials, such as a glove. Stylus contact typically gives no response. With resistive measurement, threshold force depends on the size of the contact area, and so is very different between stylus and finger. Acoustic measurement depends on the absorptive characteristics of the touching material; and with infrared, a touch may register when there has been no contact.

In spite of the advantages of force-based technologies, resistive and capacitive technologies have dominated in the touch screen market. This reflects residual difficulties with known force techniques, which must be overcome to realize the potential of force technology.

Among these difficulties are excessive force sensor size, especially the width and thickness of the sensor. Making a force sensor that has a size practical for use in very thin or very small devices has proven to be very difficult. Excessive sensitivity to transverse forces that lead to inaccuracy have also been challenging to address in force sensors. The cost and complexity of force sensors has also been an issue. Part of the complexity of force sensors is accentuated when trying to make them small enough for the desired force sensor application.

In modern touch applications, it is desirable that provisions for touch force location and/or measurement not increase the size or dictate the appearance of the touch equipped device. This is especially true in portable and hand-held applications. Conventional force sensors of the type required are typically much thicker than resistive or capacitive films, thereby potentially increasing the thickness of devices that incorporate such force sensors compared to devices that incorporate resistive or capacitive sensors. Since conventional force sensors of the type required cannot easily be made transparent, they cannot be placed in front of an active display area. As a result, devices including such conventional force sensors must typically be made wider than a resistive or capacitive based device to accommodate the force sensor. Thus, force-based touch technology is potentially disadvantageous with respect to both overall device thickness and width, when compared with other touch sensor technologies.

Most force-based technologies include some type of transducer that is sensitive to an applied force. One example of a known force sensor is disclosed by Serban et al., U.S. Pat. No. 6,531,951. Serban discloses a force sensor that includes at least one electrode that is spaced apart from a contact element. When a sufficient force is applied to the contact element, the contact element and electrode are brought into contact with each other to create an "on" signal. When an insufficient touch force is applied to the contact element, the force sensor remains in an "off" condition. Serban discloses a separator structure positioned so as to space the contact element away from the electrode when in a rest state. The size of the separator particles defines the distance the contact element must travel between a rest state and a position in which it contacts the electrode. The distance defined by the separator structure thus relates to the amount of force required to generate an "on" signal in the force sensor.

The prior art fails to disclose a force sensor that can detect a range of different applied forces from a very light applied force to an impact force with the level of accuracy required for many touch applications, while still provided the size limitations for certain force-based applications.

SUMMARY OF THE INVENTION

In one of its aspects, the invention provides a novel capacitive device configured to detect differences in an applied force over a continuous range of applied force that includes zero force. The device includes first and second electrodes that are spaced apart a predetermined distance from each other in a rest position. A measurable capacitance exists between the first and second electrodes. Structured elements having a predetermined maximum dimension are positioned in the device to control the predetermined distance between the first and second electrodes. An applied force to the device causes a change in the distance between the first and second electrodes and a related change in the capacitance that can be measured to determine information related to the applied force.

In another aspect of the invention, a capacitive force-based touch sensor assembly includes a frame, a touch sensitive surface, and multiple force-activated devices positioned between the touch sensitive surface and the frame. The force-activated devices detect an applied force to the touch sensitive surface due to a touch input. Each of the force activated devices includes first and second electrodes spaced apart a predetermined distance from each when in a rest state, with a measurable capacitance existing between the first and second electrodes. Structured elements having a predetermined maximum dimension are positioned between the first and second electrodes to control the predetermined distance. The applied force to the touch sensitive surface causes a change in the distance between the first and second electrodes and a related change in the capacitance. A change in capacitance of each device can be measured to determine information related to the location of the touch input to the touch sensitive surface.

In a further aspect of the invention, a monitor having force-based touch capabilities includes a screen and a force activated device positioned adjacent the screen for detecting an applied force to the screen. The force activated device includes first and second electrodes spaced apart a predetermined distance from each other when in a rest position, with a measurable capacitance existing between the first and second electrodes. Structured elements having a predetermined maximum dimension are positioned between the first and second electrodes to control the predetermined distance. The applied force to the screen causes a change in the distance between the first and second electrodes and a related change in the capacitance that can be measured to determine information related to the applied force.

In yet another aspect of the invention, a method is provided for manufacturing a capacitive device capable of detecting differences in an applied force over a continuous range of applied force including zero force. The device includes opposing first and second electrodes spaced apart a predetermined distance when in a rest state, the sensor having a capacitance controlled by the relative spacing between the first and second electrodes. The method includes spacing apart the first and second electrodes the predetermined distance with structured elements having a predetermined maximum dimension. The applied force to the capacitive device causes a change in the distance between the first and second electrodes and a related change in the capacitance that can be measured to determine information related to the applied force.

A yet further aspect of the invention relates to a connecting material for use in a capacitive device capable of detecting differences in an applied force over a continuous range of applied force including zero force. The device may include opposing first and second electrodes mounted to a substrate and spaced apart a predetermined distance when in a rest state. The capacitance of the sensor may be controlled by the relative spacing between the first and second electrodes. The connecting material includes a curable material and structured elements mixed within the curable material. The structured elements have a predetermined dimension and the connecting material is used to mount the first electrode to the substrate to control the predetermined distance with the structured elements.

Other features and advantages of various embodiments of the present invention will become apparent from the following description and from the claims.

DETAILED DESCRIPTION OF THE PREFERRED EMBODIMENT

In one of its aspects, the invention provides a novel capacitive force sensitive device. As described in more detail below, the device of the present invention may provide a more reliable, sensitive and accurate characterization of input forces to the devices. These improved properties of the device may be particularly advantageous when the device is used in small applications such as mobile and hand-held devices, as well as when used in larger applications such as computer monitors and other applications that require a high degree of touch and/or force sensitivity. It is anticipated that the present invention may be more broadly applicable to any application in which a force input must be characterized by, for example, the amplitude, the duration, or acceleration or speed of the force input.

One aspect of the present invention relates to a capacitive device configured to detect differences in an applied force over a continuous range of applied force including zero force. The device includes first and second electrodes that are spaced apart a predetermined distance from each other when in a rest position, and a measurable capacitance exists between the first and second electrodes. Structured elements having a predetermined maximum dimension are positioned in the device to control the predetermined distance between the first and second electrodes. The applied force to the device causes a change in the distance between the first and second electrodes and a related change in the capacitance that can be measured to determine information related to the applied force.

Figure 1:
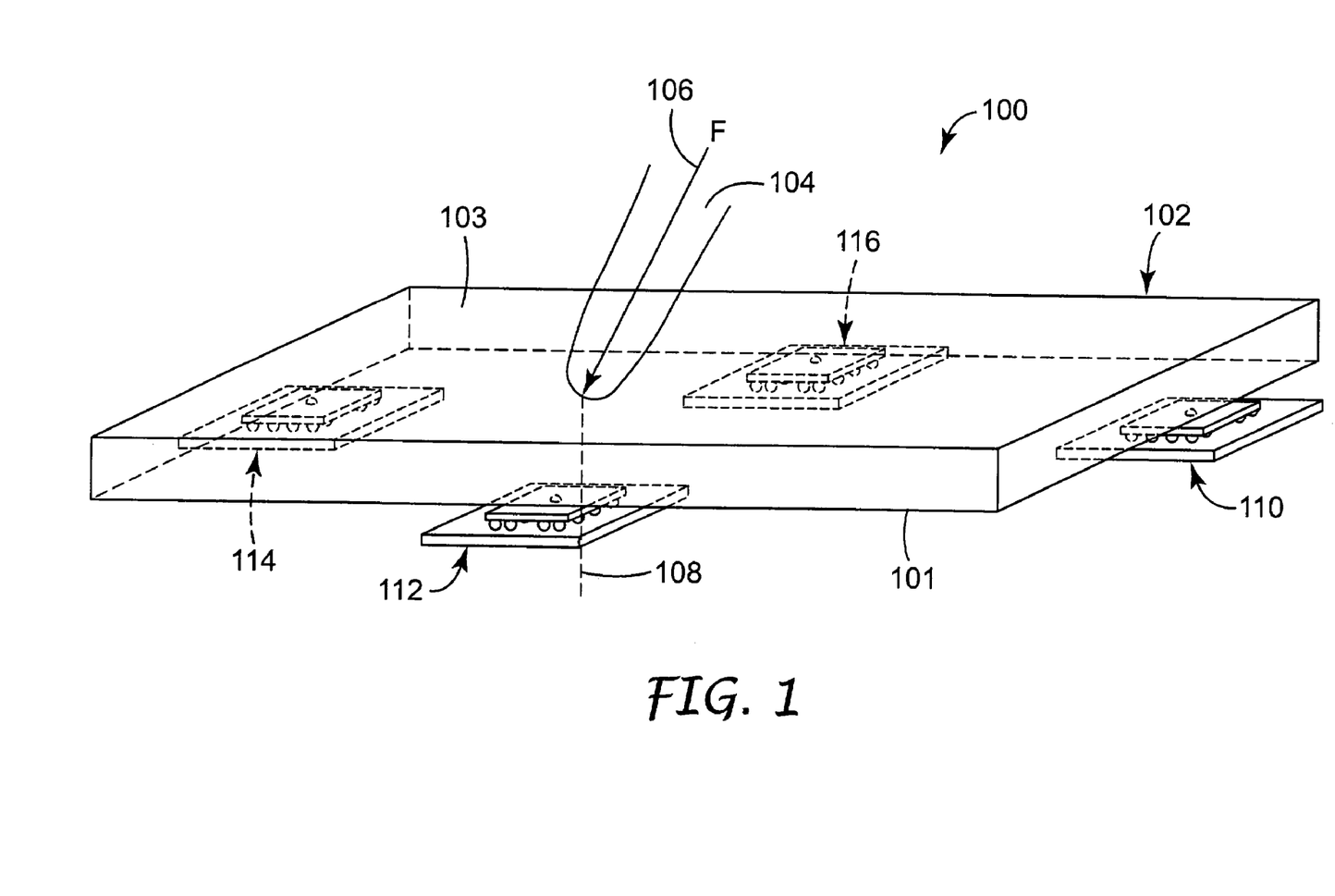
FIG. 1 is a schematic top perspective view of one example of a force-based touch sensor assembly according to principles of the invention.

A force-based sensor assembly 100 that includes principles of the present invention is illustrated in FIG. 1. Sensor assembly 100 includes an input structure 102 with first and second input surfaces 101, 103, and first, second, third and fourth transducer assemblies 110, 112, 114, 116 positioned adjacent second surface 103 at different locations around input structure 102. Transducer assemblies 110, 112, 114, 116 are electrically connected to a control module (not shown), and are configured and arranged to detect the location of a touch input to first surface 101. For example, an object 104 may apply a force along an axis 106 so as to produce a force in a normal direction 108 to input surface 101 that is detected by transducer assemblies 110, 112, 114, 116. The amount of force detected by each of the transducer assemblies 110, 112, 114, 116 can be used by the control module (not shown) to translate the applied force detected by each transducer assembly into a positional determination of the applied force by object 104.

The transducer assemblies 110, 112, 114, 116 utilize displacement caused by the applied force and capacitive properties of the transducer assemblies to determine changes within the system that are then used to determine the position of the applied force. Thus, the transducer assemblies 110, 112, 114, 116 do not actually measure force directly, but rather rely primarily on changes in capacitance in each transducer assembly to determine the position of the applied force.

Figure 2:
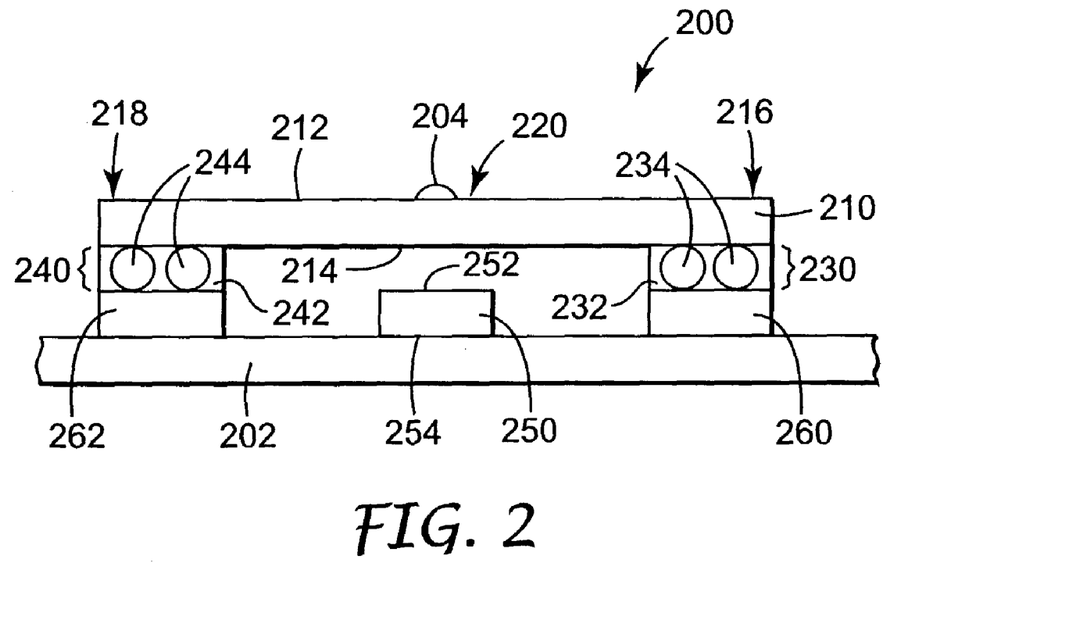
FIG. 2 is a schematic side view of one example of a capacitive force sensitive device according to the principles of present invention.

A capacitive device 200 illustrated in FIG. 2 may be used as one of the transducer assemblies shown in FIG. 1. Capacitive device 200 includes first and second electrodes 210, 250 each mounted directly or indirectly to a substrate 202. First electrode 210 includes first and second surfaces 212, 214, first and second sides 216, 218, and a center portion 220. Second electrode 250 includes first and second surfaces 252, 254. A dimple 204 may be positioned on a first surface 212 in the center portion 220 of first electrode 210 at a location directly aligned with the position of second electrode 250. The purpose of dimple 204 is to translate an applied force from an object, such as the plate shaped input structure 102 shown in FIG. 1, through a point contact of the dimple to translate the normal forces applied by the object to the capacitive device 200. In other embodiments, a different shaped dimple than the hemispherical-shaped dimple 204 shown in FIG. 2 may be used. Preferably, the dimple has structure that provides a point contact between the device and the object through which the applied force enters device 200.

First electrode 210 is indirectly secured to substrate 202 with connecting material 230, 240 positioned between second surface 214 at respective first and second sides 216, 218 of first electrode 200 and substrate 202. Connecting material 230, 240 preferably includes a curable material 232, 242 and structured elements 234, 244. The structured elements 234, 244 have a predetermined dimension defined by, for example, the diameter of the circular-shaped structured elements 234, 244, which provides a predetermined spacing between first and second electrodes 210, 250. Structured elements and connecting materials that may be applicable for use in capacitive device 200 are discussed in further detail below. Thus, regardless of the properties of the curable material 232, 234 in a cured or uncured state, the predetermined maximum dimension of the structured elements 234, 244 will define the predetermined distance between the first and second electrodes 210, 250.

In some embodiments, first electrode 210 may be directly mounted to substrate 202 using connecting material 230, 240. In other embodiments, a third electrode, represented as electrodes 260, 262, may be formed on a mounting surface of substrate 202 to provide an electrical connection between first electrode 210 and other components associated with substrate 202. For example, substrate 202 may be a printed circuit board and third electrode 260, 262 may be formed on the printed circuit board with high precision techniques. In order to provide an electrical connection between first electrode 210 and third electrode 260, 262, either the curable material 232, 242 or the structured elements 234, 244 must include an electrically conductive material. In one example, the curable material 232, 242 includes a curable conductive material such as solder, and structured elements 234, 244 include a non-conductive material such as glass. In other examples, curable material 232, 242 may be an adhesive that is non-conductive and structured elements 234, 244 include an electrically conductive material. Thus, the capacitive device 200 is structured to provide electrical connection of first electrode 210 to substrate 202 via the mounting configuration of first electrode 210 rather than having to separately mount the electrode to the circuit board and connect the electrodes to other compounds associated with the circuit board.

The second electrode 250 may likewise be mounted directly to substrate 202 or may be mounted to a fourth electrode (not shown) so as to provide an electrical connection between the second electrode 250 and other electronic components (not shown) associated with substrate 202. In the embodiment illustrated in FIG. 2, second electrode 250 could be a trace formed on a surface of substrate 202, and substrate 202 is a printed circuit board (PCB) so that a separate electrode is not needed to provide the necessary electrical connection of second electrode 250 to other electronic components.

Figure 3:
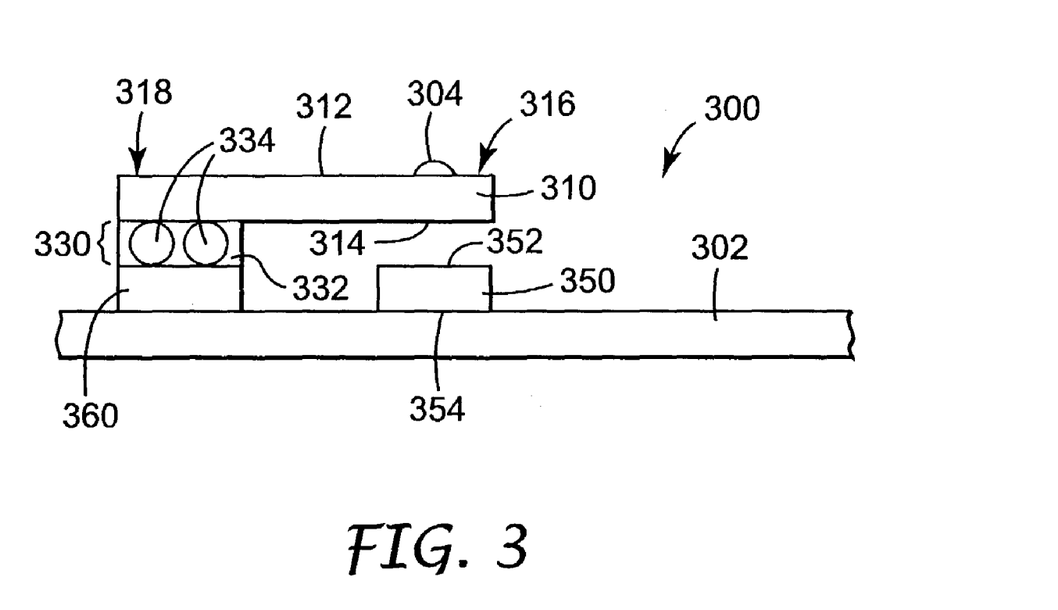
FIG. 3 is a schematic side view of another example of a capacitive force sensitive device according to the principles of present invention.

A second example capacitive device 300 is shown in FIG. 3. The capacitive device 300 includes first and second electrodes 310, 350 mounted to a substrate 302. First electrode 310 includes first and second surfaces 312, 314 and first and second sides 316, 318. Second electrode 350 also includes first and second surfaces 352, 354. Preferably, a dimple feature 304 is formed on first surface 312 at first side 316 so that the dimple is aligned with second electrode 350 on substrate 302.

First electrode 310 is mounted to substrate 302 at second side 318 using a connecting material 330. Connecting material 330 may include a curable material 332 and structured elements 334. In some embodiments, first electrode 310 may be directly mounted to substrate 302 using connecting material 330. Such a configuration may require separate electrical connection of first electrode 310 to other electronic components, for example, using wires or a flex circuit. In the capacitive device 300 shown in FIG. 3, first electrode 310 is mounted to a third electrode 360 via connecting material 330. Third electrode 360 may provide the necessary electrical connection of first electrode 310 to associated electronic components. Connecting material 330 and third electrode 360 may have the same or very similar characteristics as described above with reference to connecting material 230 and third electrode 260, 262 of capacitance device 200. Likewise, second electrode 350 may be mounted in the same or similar ways as discussed above related to second electrode 250 of capacitive device 200.

In the examples discussed above, a common feature of these capacitive devices is that a capacitance exists between the first and second electrodes. Preferably, a constant voltage is applied to either the first or the second electrode at a given frequency, for example, a frequency of 100 kHz. An amplifier or similar device, such as an op-amp, is electrically connected to the electrode that is not connected to the voltage source. With this configuration the amplifier can measure the amount of current flowing between the first and second electrodes, which amount varies as the distance between the first and second electrodes changes.

In one example configuration, the constant voltage source is electrically connected to the first electrode and the amplifier is electrically connected to the second electrode. When an applied force enters the capacitive device through the dimple or through another means that decreases the distance between the first and second electrodes, the capacitance between the first and second electrodes increases and the signal in the amplifier increases. Thus, in operation, the current measured with the amplifier can be set at zero (or another baseline value) when the capacitive device is in a rest state and any change in current flow and the related capacitance can be measured by the amplifier within a given sensitivity range. As a result, the capacitive devices of the present invention are capable of detecting differences in an applied force over a continuous range of applied force including zero force.

Also, as mentioned above, the changes in capacitance may be indicative of other information related to the applied force. For example, information related to the application of force applied to the capacitive device over a predetermined time period may be used to determine characteristics of the force such as, for example, whether the applied force was an impact force, the acceleration by which the force was applied, or the magnitude of the force, etc., depending on the capabilities of the system in which the capacitive device is incorporated.

One preferred embodiment of a capacitive device of the present invention may be well suited for use with a computer monitor. Such an embodiment may have first electrodes that include spring-tempered phosphor bronze in a flattened sheet stock having a thickness of about 0.2 mm. The first electrodes may be cut into a rectangular shape having dimensions of about 3.05 mm by 5.84 mm using a high precision method such as electric discharge machining. A dimple may be formed in the electrode using a specially designed dye that creates a dimple of about 0.2 mm in height. The first electrodes may be lapped to ensure proper thickness of the electrodes using, for example, a 30 micron diamond film for about 10 strokes. An example of a diamond film suitable for lapping is an imperial diamond film, for example, made by 3M Company. The first electrodes may then be rinsed with water and/or sonicated in an acetone base and then dried.

The substrate of the capacitive device may be a printed circuit board (PCB) having a thickness of about 0.79 mm with four ounce copper and plated with white tin (for example, PCB supplied by OnTime Circuits, Inc., Hoffman Estates, Ill.). Before use, the PCB may be lapped, for example, on a 30 micron diamond film until flat and the entire tin layer is removed. PCBs lapped with this method have been measured to be flat within about +/−1 micron. In many applications, this degree of lapping may not be required to obtain the desired results. The lapped PCBs may be rinsed with water and/or sonicated in acetone and then dried.

The connecting material may include a solder base, such as an F541 series product supplied by Heraeus, Inc., West Conshohocken, Pa. The solder balls used in this paste are type 4 (−400/+500 mesh) and made of 63SN/37PB alloy. Preferably, the flux used in this solder paste is about 10% volume or less of the paste.

The structured elements used in the connecting material may have a variety of different shapes and sizes. For example, the structured elements may be spherical shaped or pyramid shaped. Preferably, the structured elements have a predictable landing position such that a predetermined maximum dimension of the structured element will define the spacing between two objects.

One example of a structured element having particular relevance for a capacitive device using the electrodes and printed circuit boards discussed above are spherical shape Zeeospheres™ made by 3M. The structured elements preferably have a predetermined maximum dimension of about 20 to 80 microns, and most preferably about 25 microns. The structured elements are also present in the connecting material in an amount to yield about 1 to 10% volume, with about 2% volume being most preferred. Mixing of the structured elements in the connecting material can be performed in one particular embodiment as follows:

- 0.096 grams G-400 Zeeospheres™ are added to a 2 dram vial.
- 10 drops (~0.15 gram) Indium Flux No. 4 (Indium Corporation of American, Utica, N.Y.) are added to the vial. Extra flux is added as required to aid in dispersion of the Zeeospheres™ in the solder paste.
- The vial is capped and shaken, and then placed in a sonicator bath for a predetermined time period (typically about five minutes) in order to disperse the spheres. Sonification typically results in an increased viscosity of the Zeeospheres™/flux premix.
- About 19.2 grams of F541SN63-90M4 solder paste (supplied by Heracus, Inc., West Conshohocken, Pa.) is then added to the Zeeospheres™/flux premix.
- The paste/Zeeospheres™/flux mixture is then mixed until homogenous.
- The vial is capped and stored in a cool environment, such as a refrigerator, when not in use.

Other connecting materials may be composed using alternative materials having different properties than those recited in the above example.

As discussed above, the second and third electrodes of the capacitive device may simply be traces formed on a printed circuit board. However, in some embodiments the second and third electrodes may be separate pieces of material that are mounted to the printed circuit board and separately electrically connected.

Assembly of the capacitive device according to a method of the invention may include several steps. Generally, a method of manufacturing a capacitive device capable of detecting differences in an applied force over a continuous range of applied force including zero force may require a device that includes opposing first and second electrodes spaced apart a predetermined distance when in a rest state. The device includes a capacitance controlled by the relative spacing between the first and second electrodes. The method may include the steps of spacing apart the first and second electrodes the predetermined distance using structured elements that have a predetermined maximum dimension. As a result of this predetermined spacing, an applied force causes a change in the distance between the first and second electrodes and a related change in the capacitance that can be measured to determine information related to the applied force.

A method of assembling or manufacturing a capacitive device of the present invention may include the application of a connecting material, such as a solder paste, to the substrate or the first electrode. This method assumes that the second electrode is pre-formed on or pre-mounted to the substrate. In one embodiment, the solder paste may be applied to the substrate with a stencil, such as a 4 mil stencil. The stencil may be positioned on the substrate and solder paste may be applied to the top of the stencil and wiped across the stencil with a blade. The stencil is then removed from the substrate and solder paste left in the designated positions on the substrate.

Placement of the first electrode may be made with the aid of a specially designed placement bench. In some cases, a specialized vacuum chuck may be used to position and place the first electrode on the substrate so as to properly position the first electrode relative to the connecting material. In some cases, it may be advantageous to apply a force to the first electrode when bringing it into contact with the connecting material, for example, a force of 85 grams, to aid in setting the first electrode in place. Preferably, the first electrode is properly positioned so that it is adjacent to and spaced apart from a second electrode that is formed or mounted on the substrate. Once the first electrode is set in place, the substrate may be populated with other desired electrical components, such as capacitors, resistors and op-amps that may be required for proper functionality of the capacitive device.

A substrate that includes first and second electrodes and electrical components mounted to the substrate may then be bathed in a vapor electronic fluid, such as Fluorinert™ electronic fluid FC-70 made by 3M. The vapor from the vapor electronic fluid condenses on the substrate and causes reflow of the connecting material. After reflow, the substrate with its mounted components is allowed to cool. Other components may then be added to the substrate such as electrical leads that connect to the first electrode (via the connecting material) and the second electrode (for example, when the second electrode is a lead formed on the substrate).

Another step in the assembly of the capacitive device is cleaning the device. Cleaning the device may include washing the device with warm water or acetone, sonicating the device with acetone, and then drying the completed capacitive device.

Testing has shown that an embodiment of the present invention using the above disclosed materials and assembly steps provides for a very robust and durable capacitive device that maintains a high level of sensitivity and reliability.

The structure and material properties of the structured elements and other components of the capacitive device of the present invention may be important to the performance of the device. Preferably, the structured elements have a hardness that is greater than the hardness of the material used for the electrodes of the capacitive device. Specifically, the hardness of the structured element should be sufficient such that the electrodes deform prior to any measurable deformation of the structured elements and long before failure of the structured element. The G-400 series Zeeospheres™ disclosed above have a crush strength of <4,200 $kg/cm^2$, which is typically well above the elastic deformation point of the electrodes anticipated for use. Furthermore, the G-400 series Zeeospheres™ disclosed above have a hardness of 7 on the Mohs scale.

Another important property that must be considered when choosing the structural elements is the softening point of the structured element material. The softening point of the structural element must be at a much higher temperature than the melting and reflow temperature of the curable material, such as the solder (conductive curable material) discussed above. Zeeospheres™ have a softening point of about 1,020° C., which is well above the melting and reflow temperatures of any curable material anticipated for use with the present invention.

Another important property of the structured elements is the mean size of a sample of structured elements used. A given sample of structured elements will have a distribution of size about a mean value. In order to ensure a fixed predetermined maximum dimension of the structured element, screening of the structured element may be performed in order to remove structured elements having a size greater than a certain value. For example, the G-400 series of Zeeospheres™ has a mean value of 6 microns, but also has a 90th percentile size of 14 microns and a 95th percentile size of 19 microns. Thus, if the desired maximum dimension required for the capacitive device is 6 microns, it would be necessary to screen off all Zeeospheres™ with a diameter greater than 6 microns, even though the mean value is 6 microns.

Another important consideration for the structure elements is the volume content of the structured elements in the connecting material. In theory, only three structured elements are required in order to establish a plane for the first electrode. However, because of the uncertainty in the size of the structured elements in any given sample, a minimum number of structured elements must be included at each connecting point of the first electrode to the substrate to create a high probability that at least three of the structured elements having the predetermined maximum dimension are included for a given capacitive device. Preferably, a volume content of about 1 to 10% volume of structured elements in the connecting material ensures the necessary spacing. Thus far, it has been found that a volume of greater than about 10% structured elements may result in the connecting material becoming brittle or may alter the properties of the curable material in a negative way. However, using different types of curable material and flux along with certain structured elements may permit greater volumes of structured elements in the connecting material.

One advantage of using structured elements that have a predetermined maximum dimension is the resultant predictability in performance of any given capacitive device made using the same methods of manufacturing and materials. As a result of this predictability, if two or more such capacitive devices are used in a single device, such as a force-based touch sensor for a computer monitor, the force sensor may be more sensitive and locating the position of a touch input to the sensor may be more accurate. Furthermore, other important information about the touch input may be determined with improved results due to the use of the structured elements having a predetermined maximum dimension. This principal is directly applicable to the force-based sensor assembly 100 shown in FIG. 1. If each of the transducer assemblies 110, 112, 114, 116 have spacing between the first and second electrodes that is defined by a predetermined maximum dimension of structured elements positioned between the electrodes, the sensitivity and accuracy of assembly 100 may be greatly improved over known force-based touch sensor assemblies.

In some applications, multiple types of capacitive devices using features of the present invention may be used. For example, capacitive device 200 may be used in a force-based sensor assembly, such as assembly 100, to determine the location of an intended applied force. In addition, accelerometers having a structure similar to capacitive device 300 may be positioned adjacent each of the devices 110, 112, 114, 116 to identify unintentional applied forces to the assembly 100 so that those unintentional forces can be accounted for and eliminated when determining the location of an intended applied force. The capacitive devices of the present invention may also be used in a variety of other applications, such as testing and laboratory equipment, or may be used in force sensing touch panels such as those disclosed in International Publications WO 02/984580, WO 02/084579, WO 02/084578, and WO 02/084244, each of which are wholly incorporated into this document.

The configuration of capacitive device 300 may be particularly useful as an accelerometer. This type of configuration would most likely be useful for measuring acceleration in only a single direction or plane because of the orientation of the first electrode relative to the second electrode. In one embodiment, an accelerometer having a configuration similar to device 300 may be used in a system that also includes a capacitive force-based device similar to capacitive device 200. In such a system, it may be useful to position multiple accelerometers throughout the system with various orientations so forces acting upon the system can be identified. For example, a force-sensing touch screen may use accelerometers to detect forces unrelated to a touch input so that such forces can be subtracted when determining actual touch position. In some embodiments, it may also be useful to require that all accelerometers (such as devices 300) and force-based devices (such as devices 200) in the system use the same structured elements.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A capacitive device configured to detect differences in an applied force over a continuous range of applied force including zero force, the device comprising:
   first and second electrodes, the electrodes being spaced apart a predetermined distance from each other in a rest position, a measurable capacitance existing between the first and second electrodes;
   structured elements having a predetermined maximum dimension positioned to control the predetermined distance between the first and second electrodes, the structured elements connecting the first electrode to a third electrode and being held in position with a conductive curable material;
   whereby the applied force causes a change in the distance between the first and second electrodes and a related change in the capacitance that can be measured to determine information related to the applied force.

2. The device of claim 1, wherein the first and second electrodes are mounted to a substrate.

3. The device of claim 2, wherein the first electrode comprises a rectangular plate having first and second ends.

4. The device of claim 2, wherein the structured elements are positioned between the first electrode and the substrate near the first and second ends of the first electrode.

5. The device of claim 2, wherein the first electrode is positioned between the substrate and the second electrode, and is centered between the structured elements that are positioned near the first and second ends of the first electrode.

6. The device of claim 1, wherein the second and third electrodes are mounted to a substrate.

7. The device of claim 1, wherein the structured elements electrically connect the first and third electrodes together.

8. The device of claim 1, wherein the structured elements are spherical shaped, and the predetermined maximum dimension is a diameter.

9. The device of claim 8, wherein the structured elements are hollow spheres.

10. The device of claim 8, wherein the structured elements are solid spheres.

11. The device of claim 1, wherein the structured elements do not permanently deform under the applied force with an expected range during operation of the device.

12. The device of claim 1, wherein the structured elements comprise a glass material.

13. The device of claim 1, wherein the structured elements comprise a ceramic material.

14. The device of claim 1, wherein the structured elements comprise material that is non-reactive to the processing temperature of the conductive curable material.

15. The device of claim 1, wherein the structured elements have a hardness greater than a hardness of the electrodes.

16. The device of claim 1, wherein the structured elements are electrically conductive.

17. The device of claim 1, wherein the electrodes are electrically coupled through the structured elements.

18. The device of claim 1, wherein the structured elements are held in position with an adhesive.

19. A method of manufacturing a capacitive device capable of detecting differences in an applied force over a continuous range of applied force including zero force, the device including opposing first and second electrodes spaced apart a predetermined distance when in a rest state, the device having a capacitance controlled by the relative spacing between the first and second electrodes, the method comprising the steps of:
   spacing apart the first and second electrodes the predetermined distance with structured elements having a predetermined maximum dimension, the structured elements connecting the first electrode to a third electrode and being held in position with a conductive curable material;
   whereby the applied force causes a change in the distance between the first and second electrodes and a related change in the capacitance that can be measured to determine information related to the applied force.

20. The method of claim 19, wherein the maximum dimension of the structured elements is determined by screening a sample of structured elements to remove all structured elements having a dimension greater than a predetermined dimension.

21. The method of claim 20, wherein screening of the structured elements removes structured elements having a dimension greater than about 25 microns.

22. The method of claim 19, wherein the predetermined dimension is about 20 to 80 microns.

23. The method of claim 19, further comprising the steps of electrically connecting the first or second electrode to a constant voltage source, and electrically connecting the first or second electrode not electrically connected to the constant voltage source to an amplifier, wherein the change in capacitance relates to a change in current flowing from the constant voltage source to the amplifier.

24. The method of claim 19, wherein the device is formed on sub a printed circuit board with electrical traces formed thereon, and the method further comprises the step of electrically connecting the first and second electrodes to separate traces.

25. The method of claim 19, further comprising the step of forming a dimple in a surface of the first electrode.

26. A capacitive force-based touch sensor assembly, comprising:
   a frame;
   a touch sensitive surface; and
   multiple force activated devices positioned between the touch sensitive surface and the frame for detecting an applied force to the touch sensitive surface due to a touch input, each device comprising:
   first and second electrodes spaced apart a predetermined distance from each other when in a rest position, a measurable capacitance existing between the first and second electrodes;
   structured elements having a predetermined maximum dimension positioned between the first and second electrodes to control the predetermined distance, the structured elements connecting the first electrode to a third electrode and being held in position with a conductive curable material;
   whereby the applied force causes a change in the distance between the first and second electrodes and a related change in the capacitance, and the change in capacitance of each device can be measured to determine information related to the location of the touch input to the touch sensitive surface.

27. The sensor assembly of claim 26, further comprising a seal membrane that forms a seal between the frame and touch sensitive surface, and the assembly is functional as a self-contained unit.

28. The sensor assembly of claim 26, wherein each force activated device is preloaded with a force, and a touch input to the touch sensitive surface unloads the devices.

29. A monitor having force-based touch capabilities, the monitor comprising:

a screen; and a force activated device positioned adjacent the screen for detecting an applied force to the screen, the device comprising:

first and second electrodes spaced apart a predetermined distance from each other when in a rest position, a measurable capacitance existing between the first and second electrodes, the first electrode having at least one generally planar primary surface that faces a generally planar primary surface of the second electrode;

structured elements having a predetermined maximum dimension positioned between the first and second electrodes to control the predetermined distance, the structured elements connecting the first electrode to a third electrode and being held in position with a conductive curable material;

whereby the applied force causes a change in the distance between the first and second electrodes and a related change in the capacitance that can be measured to determine information related to the applied force.

30. A connecting material for use in a capacitive device capable of detecting differences in an applied force over a continuous range of applied force including zero force, the device including opposing first and second electrodes mounted to a substrate and spaced apart a predetermined distance when in a rest state, the sensor having a capacitance controlled by the relative spacing between the first and second electrodes, the connecting material comprising:

curable conductive material; and structured elements mixed within the curable conductive material, the structured elements having a predetermined dimension;

whereby the connecting material is used to mount the first electrode to the substrate to control the predetermined distance with the structured elements, and is used to connect the first electrode to a third electrode.

31. The connecting material of claim 30, wherein the structured elements make up no less than about 1% volume content of the connecting material.

32. The connecting material of claim 30, wherein the structured elements are spherical shaped.

33. The connecting material of claim 30, wherein the curable material is an adhesive.

34. The connecting material of claim 30, wherein the structured elements comprise electrically conductive material.

* * * * *

UNITED STATES PATENT AND TRADEMARK OFFICE
CERTIFICATE OF CORRECTION

PATENT NO.       : 7,148,882 B2                                            Page 1 of 1
APPLICATION NO.  : 10/439447
DATED            : December 12, 2006
INVENTOR(S)      : Robert F. Kamrath It is certified that error appears in the above-identified patent and that said Letters Patent is hereby corrected as shown below:

Column 7,
Line 61, Delete "Heracus," and insert -- Heraeus, --, therefor.

Signed and Sealed this

Sixth Day of March, 2007

JON W. DUDAS
*Director of the United States Patent and Trademark Office*